United States Patent

Clark et al.

[11] Patent Number: 5,870,896
[45] Date of Patent: Feb. 16, 1999

[54] COMBINED VALVE CONFIGURATION FOR STEAM CYCLE UNITS

[75] Inventors: Roger Bennett Clark, Scotia; Jens Kure-Jensen, Schenectady, both of N.Y.; Hideaki Miyayashiki; Tomoo Ofuji, both of Yokohama, Japan

[73] Assignees: General Electric Company, Schenectady, N.Y.; Kabushiki Kaisha Toshiba, Japan

[21] Appl. No.: 964,948

[22] Filed: Nov. 5, 1997

[51] Int. Cl.$^6$ ............................. F16K 47/14; F16K 47/04
[52] U.S. Cl. ................. 60/670; 137/625.3; 137/613; 251/127
[58] Field of Search ................. 60/643, 670, 679; 137/613, 625.3, 625.37, 625.38; 251/127

[56] References Cited

U.S. PATENT DOCUMENTS

| | | | |
|---|---|---|---|
| 4,276,906 | 7/1981 | Eguchi | 137/625.38 |
| 4,825,906 | 5/1989 | Hartman | 137/625.3 |
| 4,860,993 | 8/1989 | Goode | 137/625.37 X |
| 5,133,383 | 7/1992 | King | 137/625.3 |
| 5,287,889 | 2/1994 | Leinen | 137/625.3 |

*Primary Examiner*—Hoang Nguyen
*Attorney, Agent, or Firm*—Nixon & Vanderhye

[57] ABSTRACT

A combined control/stop valve assembly for use in steam cycle plants which include at least one steam turbine, the valve assembly including a butterfly valve having a valve plate pivotable about a first axis, and a stop valve located downstream and adjacent the butterfly valve, the stop valve having a cylindrical strainer with a longitudinal axis substantially perpendicular to the first axis, the strainer having a solid portion facing the butterfly valve.

10 Claims, 2 Drawing Sheets

COMBINED VALVE CONFIGURATION FOR STEAM CYCLE UNITS

TECHNICAL FIELD

This invention relates to steam cycle power plants and specifically, to a new steam valve for use in such plants.

BACKGROUND

Butterfly valves are used in many nuclear steam turbine applications, particularly at lower pressures than for fossil fuel turbines. Some manufacturers have now developed tight seating valves (i.e., without leakage when closed), and valves for higher pressures and temperatures than used previously. These developments have lead to the possibility of applying this type of valve as an inlet valve in steam turbines.

One of the characteristics of a butterfly valve is that it creates a fairly strong "wake" downstream in a fully open as well as in a partially closed position. This wake is often described in the literature as a "Von Karman vortex alley", so named for the Hungarian/German aerodynamicist who has described it. The wake behind a butterfly valve will subside slowly if a long run of pipe is provided down stream. In turbine valve applications, however, such a long run is generally not practical as it will leave a large volume of steam downstream of the valve which may contribute to control problems, for example, inadequate limitation of overspeed. On the other hand, if the butterfly valve is mounted close to the steam turbine inlet, the flow disturbances of the wake will enter into the first stage of the turbine where they may excite the first stage diaphragm, stationary and rotating blades, possibly causing damaging cyclic stresses in these elements. Therefore, a successful application of a butterfly valve as controlling valve for a steam turbine requires a means to protect the turbine first stage from the effects of the wake behind the valve. A "flow straightener" is a possible means for dissipating the wake, but it also requires a fairly long length of pipe and adds unwanted cost.

DISCLOSURE OF THE INVENTION

This invention seeks to make possible the use of a butterfly valve as a controlling valve located close to the turbine but at the same time, to prevent the flow disturbances from this valve from reaching into the first stage of the turbine.

An "controlling valve" is normally located downstream of a stop valve, and is used for the admission control of steam into a turbine in a steam cycle system. Unfortunately, in this position, the wake from a butterfly valve would easily reach into the first turbine stage with the undesired effect(s) described above.

Airtests have shown that the strainer commonly used in stop valves for steam turbines will act to dissipate flow disturbances approaching the stop valve, especially if the strainer is configured with this purpose in mind, and as disclosed herein in accordance with the exemplary embodiment of the invention.

The invention thus proposes to take advantage of this characteristic of the cylindrical strainer in a conventional poppet type stop valve by positioning the controlling valve in front of the stop valve. The placement of a controlling valve ahead of the stop valve is not novel. In fact, this placement is found in many GE designed combined reheat valves as well as in combined stop and control valves with the strainer upstream of both valves. To use a butterfly valve as the controlling valve, however, the strainer must be positioned downstream of the controlling butterfly valve. From computational fluid dynamic (CFD) analysis, we have discovered that pressure drop through the strainer and adjustment of the size of the blank area in the strainer (i.e., one without any flow openings) directly opposing the inlet flow to the stop valve will produce uniform flow and contribute significantly to preventing butterfly valve flow disturbances from passing through the stop valve and the first stage.

The placement of the strainer downstream of the controlling valve and the above described configuration including a blank area are not detrimental to the main purposes of the strainer. These are to filter out particles and foreign objects (originating in the steam generator or left behind in the piping system during fabrication, assembly or maintenance) and to prevent these items from blocking the stop valve or causing damage to the turbine.

The preferred orientation of the butterfly valve shaft is at a right angle to the axis of the cylindrical strainer in the stop valve. If the butterfly valve shaft were parallel to the axis of the strainer, there is a possibility that the flow disturbances would penetrate into the annulus between the strainer and the stop valve casing and from there through the stop valve and into the turbine.

Accordingly, in its broader aspects, the invention relates to a combined control/stop valve assembly for use in combined cycle or other steam plants which include at least one steam turbine, the valve assembly comprising a butterfly valve including a valve plate pivotable about a first axis, and a stop valve located downstream and adjacent the butterfly valve, the stop valve having a cylindrical strainer with a longitudinal axis substantially perpendicular to the first axis, the strainer preferably having a solid portion facing said butterfly valve.

In another aspect, the invention relates to a steam turbine fluid control system for a combined cycle or other steam plant which includes at least one steam turbine adapted to receive steam, and which further includes at least one controlling valve assembly for admission control of steam to a steam turbine, the improvement wherein the controlling valve assembly includes a butterfly valve located in a conduit, the butterfly valve having a valve plate pivotable about a shaft; and a stop valve located downstream of and in proximity to the butterfly valve, the stop valve having an inlet for receiving flow and a substantially cylindrical strainer, a first circumferential portion of which has flow openings therein and a second circumferential portion of which has no flow openings therein, the second circumferential portion being located adjacent the inlet.

In still another aspect, the invention relates to a steam turbine fluid control system for a combined cycle or other steam plant which includes at least one steam turbine adapted to receive steam, and which further includes at least one controlling valve for controlling admission of the steam to the steam turbine, the improvement comprising a butterfly valve located in a conduit, the butterfly valve having a valve plate pivotable about a shaft; a stop valve located downstream of and in proximity to the butterfly valve, the stop valve having an inlet for receiving flow and a substantially cylindrical strainer, the strainer having a longitudinal center axis; wherein the butterfly valve and the strainer arranged so that the shaft and the longitudinal center axis are substantially perpendicular; and further wherein the strainer includes a solid peripheral portion extending about 60° about the circumference of the strainer and arranged so that flow through the inlet impinges on the solid peripheral portion.

Other objects and advantages will become apparent from the detailed description which follows.

BEST MODE FOR CARRYING OUT THE INVENTION

Figure 1:
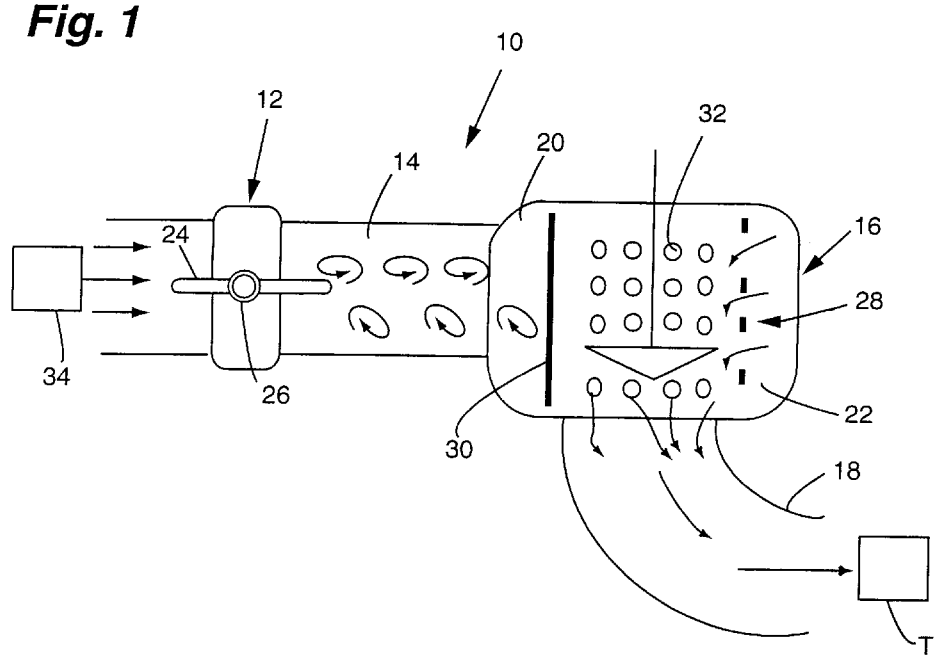
FIG. 1 is a generally schematic side elevation of a combined valve assembly in accordance with the invention.
Figure 2:
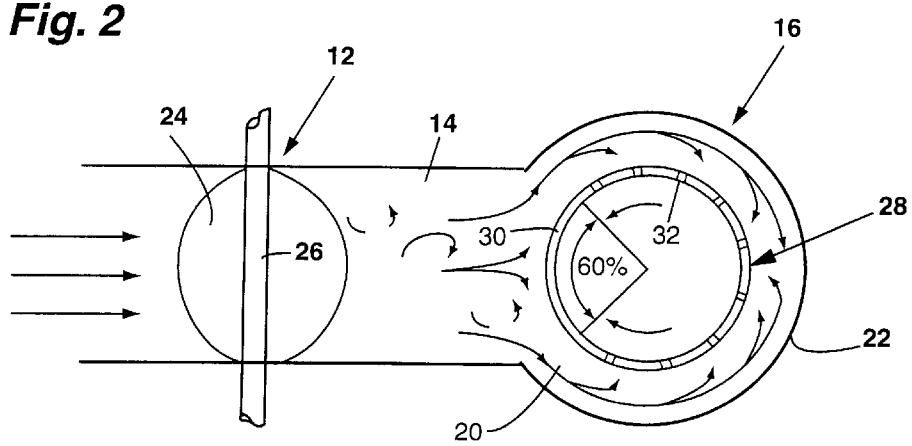
FIG. 2 is a plan view of FIG. 1.

With reference to FIGS. 1 and 2, the new combined valve assembly 10 in accordance with this invention includes a butterfly valve 12 located in a conduit 14 upstream but in relatively close proximity to a stop valve 16 which, in turn, controls flow of steam to the first stage of a turbine T via conduit 18. Thus, the inlet side to the stop valve is shown at 20 while the outlet of the stop valve is shown at 22.

The butterfly valve 12, while built to specifications, is nevertheless of otherwise conventional construction including a valve plate 24 bisected by a pivot shaft 26 extending transversely to the longitudinal axis of the conduit 14. The plate 24 is shown in the full open position, it being understood that rotation of the plate 90° will bring it to a full closed position, shutting off all flow to the reheat stop valve 16.

Figure 3:
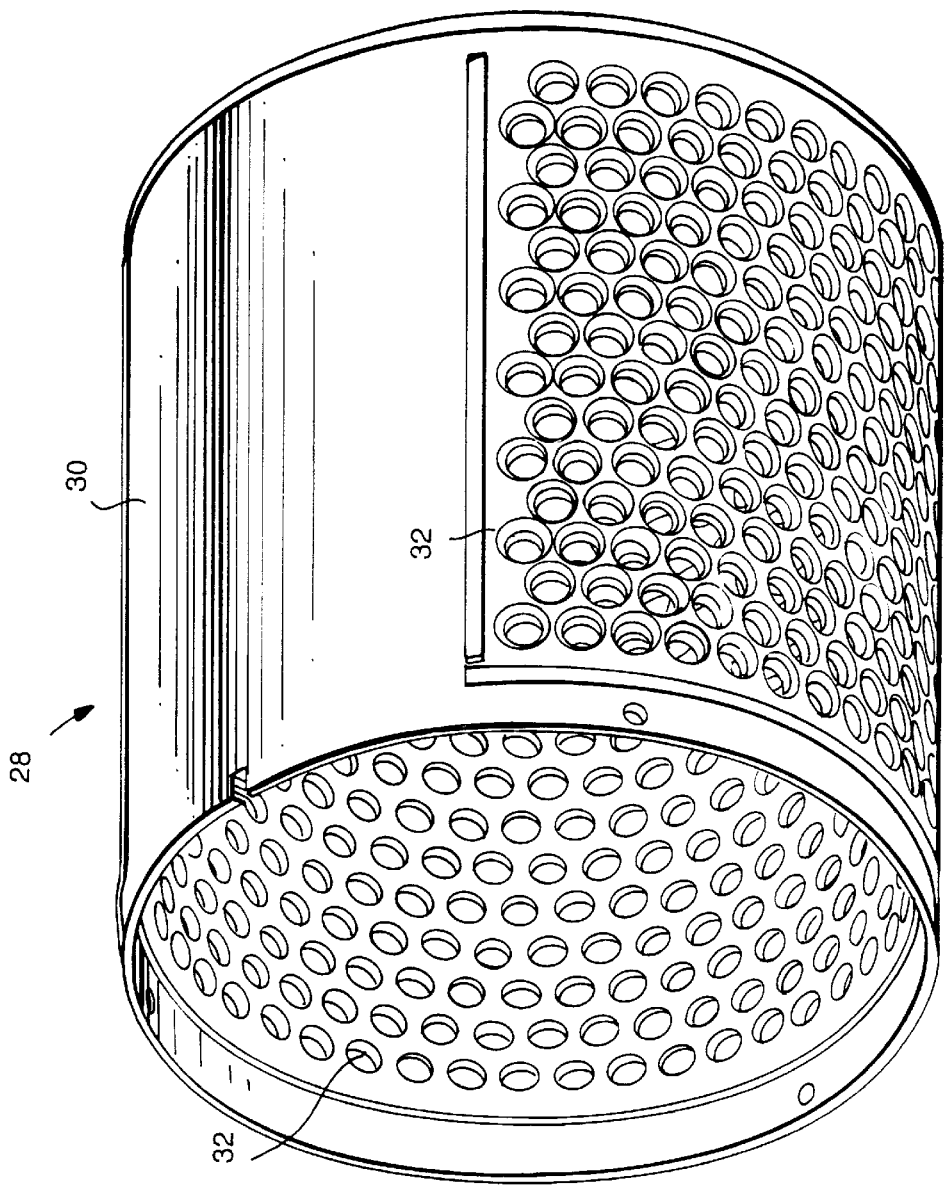
FIG. 3 is a perspective view of a cylindrical strainer used in accordance with the invention.

The stop valve 16 is also of conventional construction but, in accordance with this invention, incorporates a redesigned strainer 28. More specifically, the strainer 28 is a substantially cylindrical member oriented within the stop valve so that the longitudinal center axis of the strainer is perpendicular to the pivot shaft 26 of the butterfly valve 12. In addition, the strainer is configured so that a circumferential portion 30 of the peripheral wall of the strainer is solid. As shown in FIGS. 2 and 3, the portion 30 extends about 60° or ⅙ the circumference of the strainer, the remaining 300° of the strainer being perforated in the usual fashion as illustrated by the flow openings 32 (existing strainers have blank areas extending 70°–80° about the circumference of the strainer). Note that the strainer is arranged so that the solid section 30 is centered within the inlet 20, i.e., it faces the conduit 14 such that flow through the conduit 14 into the stop valve will impinge upon the solid section 30 causing the flow to divert around the solid section 30 and then through the openings 32 before exiting the stop valve via outlet 22 into the conduit 18. In this regard, the stop valve and the strainer are sized so that all flow must exit through the strainer lower end, i.e., all flow enters the strainer via holes 32 and exits through the bottom of the strainer into the outlet 22.

The above arrangement protects the turbine's first stage from the effects of the wake created by the butterfly valve as described above. More specifically, the blank or solid area 30 of the strainer 28 directly opposing the inlet flow to the stop valve 16 contributes significantly to preventing upstream flow disturbances from passing through the stop valve and reaching the turbine first stage. In addition, the preferred orientation of the butterfly valve shaft 26 vis-a-vis the axis of the cylindrical strainer 28 results in the breaking up of the vortices from the butterfly valve as they approach the strainer at a 90° angle.

In a typical arrangement for the valve assembly described above, steam exiting the superheater or reheater of a steam generator 34 in a steam cycle plant, is routed to the inlet of the steam turbine T. The admission of this steam to the steam turbine is controlled by the valve assembly 10 which is located in relatively close proximity to the IP inlet. The valve assembly in accordance with this invention is not limited to this application however.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A combined control/stop valve assembly for use in steam cycle plants which include at least one steam turbine, said valve assembly comprising a butterfly valve including a valve plate pivotable about a first axis, and a stop valve located downstream and adjacent said butterfly valve, said stop valve having a cylindrical strainer with a longitudinal axis substantially perpendicular to said first axis, said strainer having a solid portion facing said butterfly valve.

2. The assembly of claim 1 in combination with a steam cycle power plant including a steam turbine, said assembly located in a conduit arranged to supply steam to the steam turbine.

3. The assembly of claim 1 wherein said strainer has flow openings located in an array extending substantially 300° about the circumference of the strainer.

4. The assembly of claim 3 wherein said solid portion comprises a remaining 60° of the circumference of said strainer.

5. The assembly of claim 4 wherein said stop valve and strainer are configured so that all flow entering the stop valve must flow through the strainer.

6. In a reheat steam turbine fluid control system for a steam cycle plant which includes at least one steam turbine adapted to receive steam, and which further includes at least one controlling valve assembly for admission control of steam to a steam turbine, the improvement wherein said controlling valve assembly includes:

a butterfly valve located in a conduit, said butterfly valve having a valve plate pivotable about a shaft; and a stop valve located downstream of and in proximity to said butterfly valve, said stop valve having an inlet for receiving flow and a substantially cylindrical strainer, a first circumferential portion of which has flow openings therein and a second circumferential portion of which has no flow openings therein, said second circumferential portion being located adjacent said inlet.

7. The assembly of claim 6 in combination with a steam cycle power plant including a steam turbine, said assembly located in a conduit arranged to supply reheat steam to the steam turbine.

8. The assembly of claim 6 wherein said stop valve and strainer are configured so that all flow entering the stop valve must flow through the strainer.

9. In a reheat steam turbine fluid control system for a steam cycle plant which includes at least one steam turbine adapted to receive steam, and which further includes at least one control valve for controlling admission of the steam to the steam turbine, the improvement comprising:

a butterfly valve located in a conduit, said butterfly valve having a valve plate pivotable about a shaft;

a stop valve located downstream of and in proximity to said butterfly valve, said stop valve having an inlet for receiving flow and a substantially cylindrical strainer, said strainer having a longitudinal center axis; wherein said butterfly valve and said strainer arranged so that said shaft and said longitudinal center axis are substantially perpendicular; and further wherein said strainer includes a solid peripheral portion extending about 60° about the circumference of the strainer and arranged so that flow through said inlet impinges on said solid peripheral portion.

10. The system of claim 9 wherein said solid peripheral portion is centered within said inlet.

* * * * *